United States Patent [19]

Tanaka

[11] Patent Number: 5,033,819
[45] Date of Patent: Jul. 23, 1991

[54] LIGHT INTERCEPTING DEVICE IN LENS BARREL

[75] Inventor: Hitoshi Tanaka, Tokyo, Japan

[73] Assignee: Asahi Kogaku Kogyo Kabushiki Kaisha, Tokyo, Japan

[21] Appl. No.: 475,199

[22] Filed: Feb. 5, 1990

[30] Foreign Application Priority Data

Feb. 10, 1989 [JP] Japan .................. 1-14882[U]

[51] Int. Cl.⁵ .................................. G02B 7/02
[52] U.S. Cl. .......................... 350/255; 350/429; 350/580; 354/400
[58] Field of Search ............ 350/255, 429, 430, 580; 354/286, 195.11, 195.12, 400

[56] References Cited

U.S. PATENT DOCUMENTS

| | | |
|---|---|---|
| 2,254,537 | 9/1941 | Nerwin . |
| 3,809,459 | 5/1974 | Wakamiya et al. . |
| 4,002,402 | 1/1977 | Mito . |
| 4,183,661 | 1/1980 | Ohkura ................. 355/61 |
| 4,214,829 | 7/1980 | Ohashi .................. 354/197 |
| 4,382,661 | 5/1983 | Kamata ................. 350/430 |
| 4,441,794 | 4/1984 | Field .................... 350/580 |
| 4,472,033 | 9/1984 | Fukuhara et al. ....... 350/429 |
| 4,730,901 | 3/1988 | Suzuki et al. .......... 350/255 |
| 4,793,689 | 12/1988 | Aoyagi et al. .......... 350/255 |
| 4,911,542 | 3/1990 | Nishio et al. .......... 350/429 |

FOREIGN PATENT DOCUMENTS

1-167715 7/1989 Japan .................. 350/255

Primary Examiner—Bruce Y. Arnold
Assistant Examiner—Loha Ben
Attorney, Agent, or Firm—Sandler, Greenblum & Bernstein

[57] ABSTRACT

A lens barrel includes a control unit which has an operation pin which is moved in the circumferential direction by an angular displacement corresponding to an object distance signal generated by an object distance measuring device. A lens frame carries a focusing lens group and is screw-engaged by the control unit to be engaged by the operation pin so as to move together therewith in the circumferential direction. An annular member moves substantially together with the control unit in the optical axis direction and is located in front of the lens frame of the focusing lens group. The light intercepting device includes a first light intercepting cylindrical portion which is provided on the annular member to extend to the outer periphery of the focusing lens group, or the vicinity thereof, and a second light intercepting cylindrical portion which is provided on the lens frame of the focusing lens group to always at least partially overlap the first light intercepting cylindrical portion in the optical axis direction.

15 Claims, 2 Drawing Sheets

LIGHT INTERCEPTING DEVICE IN LENS BARREL

BACKGROUND OF THE INVENTION

1. Field of the Invention

The present invention relates to a light intercepting device in a lens barrel of a camera which as a photographing lens system and a separate finder optical system.

2. Description of Related Art

In a conventional compact camera having a photographing lens system and a finder optical system separate from the photographing lens system, a lens frame which supports a group of focusing lenses is screw-engaged in a center portion of a control unit which controls the focus and exposure. The lens frame is engaged by an operation pin of the control unit to move together in a circumferential direction. The operation pin is rotated by an angular displacement corresponding to an object distance signal which is detected by an object distance measuring device to rotate the lens frame thereby to move the focusing lens group to a focal position. The control unit has a shutter sector which is opened and closed in accordance with a brightness signal detected by a brightness detecting device.

Although the basic arrangement mentioned above has been directed to a camera having a fixed focal length lens, the same is true in a zoom lens camera or a camera having two focal lengths (multiple focal lengths). However, the axial displacement of the control unit which supports the focusing lens group in a zoom lens camera or a two-focus camera is larger than that in the fixed focus camera. This makes it difficult to completely intercept light within the periphery of the control unit, particularly in a zoom lens camera or a two-focal lengths camera. Namely, a large axial displacement of the control unit which carries the focusing lens group takes place when the focal length varies. On the other hand, the control unit must be electrically connected to the object distance measuring device and the brightness detecting device on the camera body. The electrical connection is usually made by a flexible printed circuit board (FPC board) which flexibly runs through and around the control unit. To this end, there are gaps in the periphery of the control unit, through which the FPC board extends. The gaps, however, make it difficult to completely intercept light.

Furthermore, a conventional light intercepting device usually includes a slide member for intercepting light, such as a light intercepting ring which, however, causes slide or frictional resistance. The large slide resistance increases the drive force or torque necessary for driving the control unit and the zooming operation, etc.

SUMMARY OF THE INVENTION

The primary object of the present invention is to provide a light intercepting device which can easily and effectively intercept light in the lens barrel of a lens shutter camera, especially in the periphery of a control unit which carries a group of focusing lenses.

Another object of the present invention is to provide a light intercepting device in which light can be intercepted by a light intercepting member which does not cause slide resistance.

The inventor of the present invention has found that conventional light intercepting devices have been directed to the interception of light in the outer periphery of the control unit, which makes it difficult to completely intercept light particularly when large displacement (advance) of the control unit (focusing lens group) takes place.

The inventor has conceived a light intercepting mechanism which is provided within the outermost periphery of the annular control unit to intercept light which would otherwise enter the control unit from the center portion of the focusing lens group.

To achieve the object mentioned above, a lens barrel comprising a control unit which has an operation pin which is moved in the circumferential direction by an angular displacement corresponding to an object distance signal generated by an object distance measuring device is provided. A lens frame which carries a focusing lens group and which is screw-engaged by the control unit to be engaged by the operation pin so as to move together therewith in the circumferential direction is also provided. An annular member which moves substantially together with the control unit in the optical axis direction is located in front of the lens frame of the focusing lens group. A light intercepting device comprising a first light intercepting cylindrical portion is provided on the annular member and extends to the outer periphery of the focusing lens group, and a second light intercepting cylindrical portion is provided on the lens frame of the focusing lens group and always overlaps with the first light intercepting cylindrical portion of the annular member in the optical axis direction.

To "always overlap" means that the second light intercepting cylindrical portion of the lens frame partially overlaps the first light intercepting cylindrical portion of the annular member within a displacement range of the focusing lens group in the course of focusing to prevent light from entering between the lens frame and the annular member.

BRIEF DESCRIPTION OF THE DRAWINGS

The invention will be described below in detail with reference to the accompanying drawings, in which.

DESCRIPTION OF PREFERRED EMBODIMENTS

Figure 1:
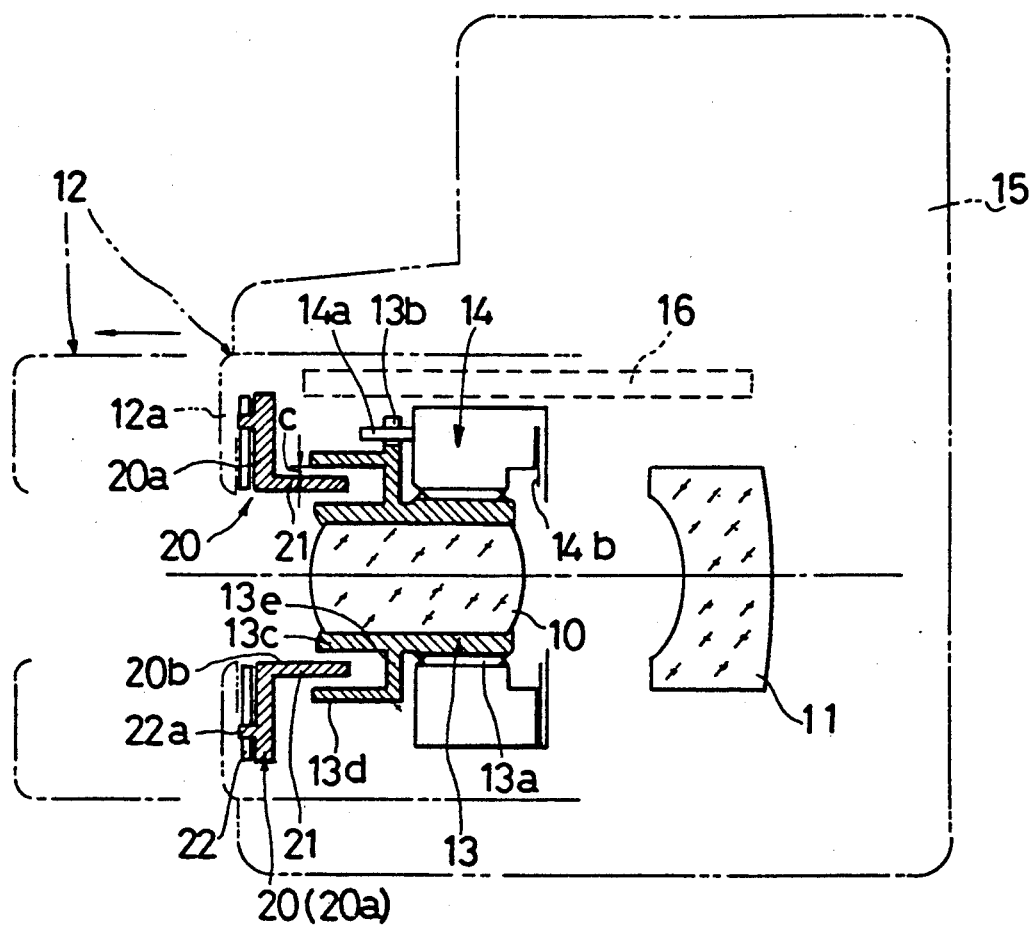
FIG. 1 is a sectional view of a main part of a light intercepting device, according to an aspect of the present invention.
Figure 2:
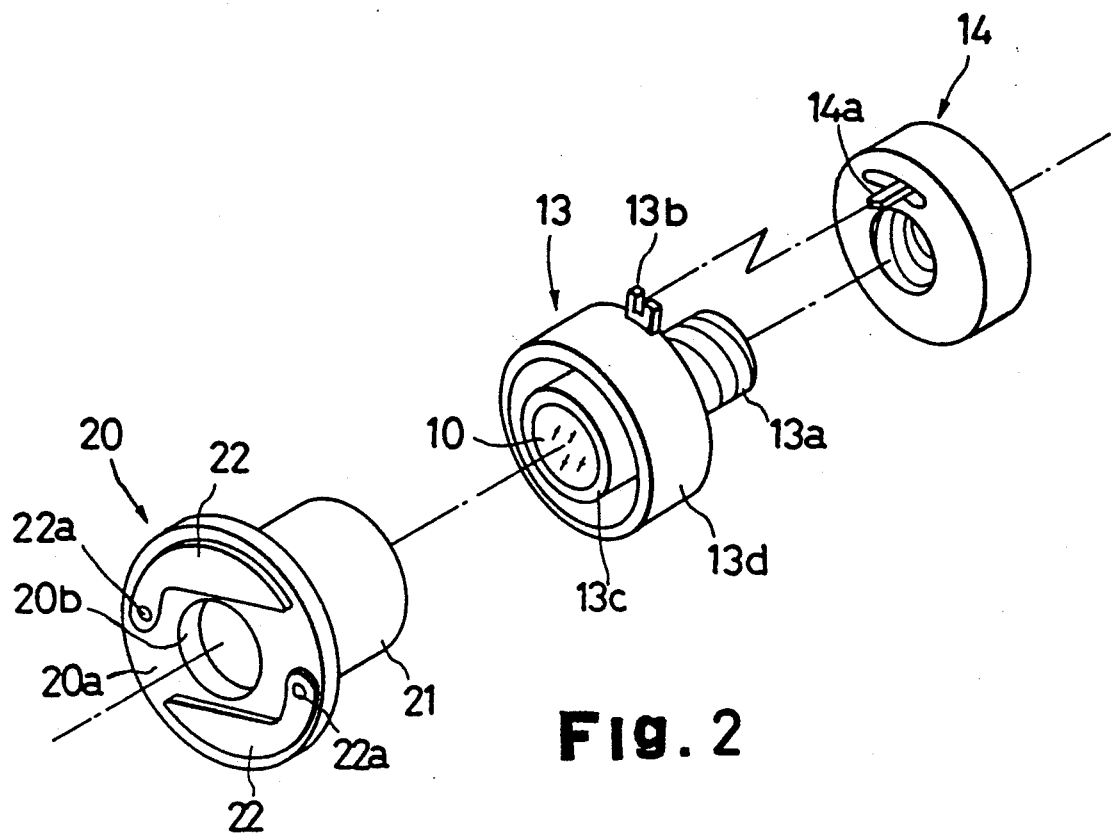
FIG. 2 is an exploded perspective view of a main part of a light intercepting device, shown in FIG. 1; and, FIG. 3 is a sectional view of a main part of a light intercepting device, according to another aspect of the present invention.

The illustrated embodiment is applied to a lens barrel having two groups of zoom lenses, i.e. a front lens group (focusing lens group) 10 and a rear lens group 11. The front and rear lens groups 10 and 11 move in the optical axis direction to change a spatial distance therebetween in a specific relationship in order to vary the focal length. The displacement mechanism of the lens groups 10 and 11 is well known per se. An outer peripheral light intercepting frame 12 which moves substantially together with the front lens group 10 moves between a position shown at a two-dotted chain line and a position shown at a one-dotted chain line during the zooming in the illustrated embodiment.

The front lens group 10 is secured to the lens frame 13 which is screw-engaged by a center portion of a control unit 14 through a helicoid 13a provided on the lens frame 13. The control unit 14 has an operation pin 14a which is driven to move in the circumferential direction, and a shutter sector 14b which controls a photographing light path. The operation pin 14a is engaged by an association arm 13b provide on the lens frame 13 to radially project therefrom so as to rotate together in the circumferential direction.

The operation pin 14a is rotated by an angular displacement corresponding to an object distance which is detected by an object distance measuring device (not shown) provided on a camera body 15 to detect a distance of an object to be photographed. The shutter sector 14b opens the photographing light path for a predetermined time corresponding to a brightness signal which is detected by a brightness detecting device (not shown) provided on the camera body to detect the brightness of the object to be photographed. The control unit 14 and a control device (not shown) in the camera body 15 must be electrically connected to each other within the whole displacement range of the control unit 14 (focusing lens group 10) to transmit and receive the signals therebetween. To this end, a space 16 in which a connecting member (e.g. a flexible printed circuit board) extends is provided in the camera body 15.

For example, in a conventional lens shutter camera as constructed above, according to one of the significant features of the present invention, a first light intercepting cylindrical portion 21 which extends to the outer periphery of the front lens group 10 or the vicinity thereof within the outermost periphery of the annular control unit 14 is integrally provided on a barrier support (inner annular member) 20 which is located in front of the front lens group 10 to be integral with the outer peripheral light intercepting frame 12. Furthermore, according to one of the significant features of the present invention, a second light intercepting cylindrical portion 13d is integrally provided on the lens frame 13 to partially overlap the first light intercepting cylindrical portion 21. In the illustrated embodiment, there is a relatively large clearance "c" between the first and second light intercepting cylindrical portions 21 and 13d for the sake of clarification. Actually, the clearance "c" should be minimized as much as possible under the condition that the first and second light intercepting cylindrical portions 21 and 13d are prevented from coming into contact with each other.

The barrier support 20 supports a pair of barriers 22 which are provided on an annular circular disc plate 20a thereof to open and close a photographing aperture 20b (a terminal end of the first light intercepting cylindrical portion 21). The barriers 22 rotate about respective pivot shafts 22a provided on the annular circular disc plate 20a.

The barrier support 20 is secured to an inner wall surface of a front end 12a of the outer peripheral light intercepting frame 12, so that no light enters the outer peripheral light intercepting frame 12 from the outer periphery thereof.

The lens frame 13 has a cylindrical body 13c which directly supports the front lens group 10 and an annular circular flange 13e perpendicularly projecting from the cylindrical body 13c. The second light intercepting cylindrical portion 13d is integrally formed on the annular circular flange 13e.

The lengths of the first and second light intercepting cylindrical portions 21 and 13d are such that the first and second light intercepting cylindrical portions 21 and 13d overlap each other in the optical axis direction to prevent light from entering therebetween, within the whole displacement range of the front lens group 10 (lens frame 13) in the course of focusing. The lens frame 13 and the barrier support 20 are provided with appropriate anti-reflection means.

It can be easily understood that even when the front lens group 10 (control unit 14) moves forward and backward along the optical axis directions, the overlapped portion of the first and second light intercepting cylindrical portions 21 and 13d prevents light from entering the outer peripheral portion of the control unit 14.

Figure 3:
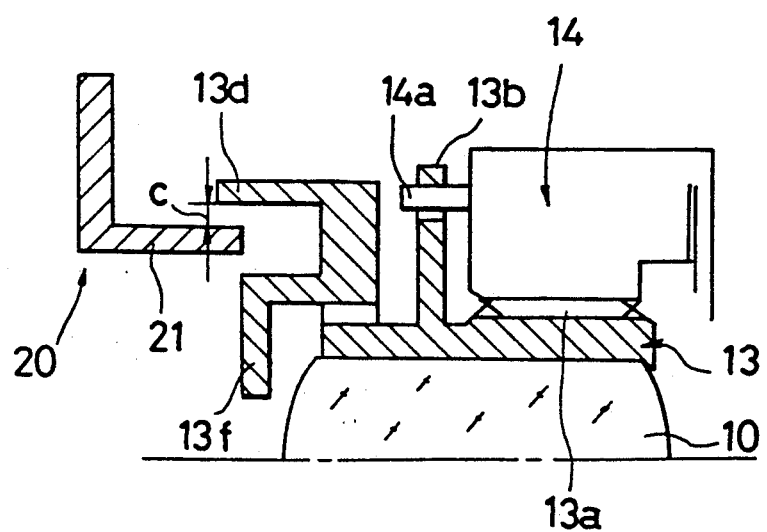

In the above-mentioned embodiment, the second light intercepting cylindrical portion 13d is formed integrally with the lens frame 13. Alternatively, it is also possible to form a second light intercepting cylindrical portion 13d on a lens keep ring 13f which forms a part of the lens frame 13, as shown in FIG. 3.

In an alternative, the annular member of which the first light intercepting cylindrical portion 21 is made in the first embodiment can be made of an annular member other than the barrier support 20.

Although the above-mentioned embodiments have been directed to a zoom lens in which the present invention can be most advantageously used, the present invention can be also applied to a camera having a lens with two focal lengths or with a fixed focal length.

As can be seen from the foregoing, according to the present invention, since the light intercepting cylindrical portions are provided on the lens frame of the focusing lens group and the annular member located in front of the lens frame to overlap with each other in the optical axis direction, no light can enter the lens barrel through the inner periphery of the control unit with which the lens frame engages. Furthermore, since the pair of light intercepting cylindrical portions overlap each other, only a small space is necessary. In addition, since the light intercepting cylindrical portions do not contact with each other, no slide resistance occurs therebetween, unlike the prior art mentioned before. Furthermore, according to the present invention, the light intercepting cylindrical portions can be formed integrally with the existing camera components, resulting in a reduced manufacturing cost and an inexpensive assembly of the device.

I claim:

1. A lens barrel comprising a control unit which has an operation pin which is moved in the circumferential direction by an angular displacement corresponding to an object distance signal generated by an object distance measuring device, a lens frame which carries a focusing lens group and which is screw-engaged to the control unit to be engaged with the operation pin so as to move together with said operation pin in the circumferential direction, an annular member which is movable substantially together with the control unit in the optical axis direction and which is located in front of said lens frame of said focusing lens group, and a light intercepting device comprising a first light intercepting cylindrical portion which is provided on said annular member to extend to the vicinity of the outer periphery of said focusing lens group, and a second light intercepting cylindrical portion which is provided on said lens frame of said focusing lens group to always at least partially overlap said first light intercepting cylindrical portion of said annular member in the optical axis direction.

2. A light intercepting device in a lens barrel, according to claim 1, wherein said annular member which is movable substantially together with said control unit is made of an outer peripheral light intercepting frame which is located at the outermost portion of a lens system including said focusing lens group.

3. A light intercepting device in a lens barrel, according to claim 2, further comprising an annular barrier support secured to said outer peripheral light intercepting frame.

4. A light intercepting device in a lens barrel, according to claim 3, wherein said annular barrier support has an annular circular plate at the front end thereof.

5. A light intercepting device in a lens barrel, according to claim 4, wherein said first light intercepting cylindrical portion provided on said outer peripheral light intercepting frame extends rearward from said annular circular plate at the front end of said annular barrier support.

6. A light intercepting device in a lens barrel, according to claim 1, further comprising a lens keep ring for holding said focusing lens group on said lens frame.

7. A light intercepting device in a lens barrel, according to claim 6, wherein said second light intercepting cylindrical portion is provided on said lens keep ring.

8. A light intercepting device in a lens barrel, according to claim 1, wherein said first and second light intercepting cylindrical portions do not contact each other.

9. A light intercepting device in a lens barrel including an annular control unit which has an operation pin which is moved in the circumferential direction by an angular displacement corresponding to an object distance signal generated by an object distance measuring device, and a lens frame which carries a focusing lens group and which is screw-engaged by the control unit to be engaged by said operation pin so as to move together with said operation pin in the circumferential direction, and a light intercepting mechanism which is located within the outermost portion of said annular control unit to prevent light from entering said control unit from the center portion of the focusing lens group.

10. A light intercepting device in a lens barrel, according to claim 9, wherein said light intercepting mechanism comprises an outer peripheral light intercepting frame which is located at the outermost portion of a lens system including said focusing lens group to move substantially together with the control unit, an inner annular member which has an annular circular plate at the front end thereof, secured to said outer peripheral light intercepting frame and a light intercepting cylindrical portion which extends rearwardly from the inner periphery of said annular circular plate, and another light intercepting cylindrical portion which extends forwardly from said lens frame of said focusing lens group and which always at least partially overlaps said first light intercepting cylindrical portion of said inner annular member.

11. A light intercepting device in a lens barrel, according to claim 10, wherein said inner annular member is made of a barrier support having an annular circular plate which supports barriers for opening and closing a photographing aperture.

12. A light intercepting device in a lens barrel, according to claim 11, wherein said lens frame of the focusing lens group has a lens keep ring which holds said focusing lens group on said lens frame.

13. A light intercepting device in a lens barrel, according to claim 12, wherein said another light intercepting cylindrical portion is provided on the lens keep ring.

14. A light intercepting device in a lens barrel, according to claim 10, wherein said light intercepting cylindrical portion of said inner annular member and said light intercepting cylindrical portion of said lens frame of said focusing lens group do not contact each other.

15. A lens barrel including a lens frame which carries a focusing lens group, and an annular member which is located in front of said lens frame of the focusing lens group, wherein said lens frame and said annular member move relatively in the optical axis direction, and a light intercepting device comprising a first light intercepting cylindrical portion which is provided on said annular member to extend to the vicinity of the outer periphery of the focusing lens group, and a second light intercepting cylindrical portion which is provided on said lens frame of said focusing lens group to always at least partially overlap said first light intercepting cylindrical portion of said annular member in the optical axis direction.

* * * * *